United States Patent [19]
Ishida et al.
[11] 3,885,067
[45] May 20, 1975

[54] METHOD FOR TREATING A POLYESTER SYNTHETIC FIBER FOR USE AS A RUBBER-REINFORCING MATERIAL

[75] Inventors: Hiroaki Ishida, Ohiso; Koji Maruyama, Chigasaki; Kenzi Katsushima, Hiratsuka, Japan

[73] Assignee: The Yokohama Rubber Co. Ltd., Tokyo, Japan

[22] Filed: May 18, 1973

[21] Appl. No.: 361,762

[30] Foreign Application Priority Data

May 29, 1973 Japan ............................... 47-53121

[52] U.S. Cl. ............................... 427/381; 156/335
[51] Int. Cl. ........................ B32b 25/08; B32b 27/36
[58] Field of Search ............ 156/335; 117/76 T, 72, 117/138.8 F

[56] References Cited

UNITED STATES PATENTS

| | | | |
|---|---|---|---|
| 3,304,222 | 2/1967 | Wilken | 156/335 X |
| 3,396,065 | 8/1968 | Ney | 156/335 |
| 3,798,051 | 3/1974 | Morita | 117/76 T X |

*Primary Examiner*—Ralph Husack
*Attorney, Agent, or Firm*—Lane, Aitken, Dunner & Ziems

[57] ABSTRACT

A two-stage treatment for polyester fibers to improve their adhesion to rubber. In the first stage a solution containing a reaction product of an excess of resorcinol, an allyl halide, and an alkali metal hydroxide is applied to the polyester fiber. In the second stage treatment a conventional latex condensate of resorcinol and formaldehyde is further applied to the polyester fiber.

8 Claims, No Drawings

METHOD FOR TREATING A POLYESTER SYNTHETIC FIBER FOR USE AS A RUBBER-REINFORCING MATERIAL

BACKGROUND OF THE INVENTION

This invention relates to a method for treating a polyester synthetic fiber to render it more suitable for use as a rubber-reinforcing material.

Synthetic fibers such as nylon, rayon, polyesters, etc., have been used for the reinforcement of rubber products including tires, belts, and hoses. The nylons, rayons and vinylons can be strongly adhered to rubber when impregnated with a resorcinol-formaldehyde resin latex adhesive (which is generally called RFL and hereinafter referred to as such). On the other hand, polyester fibers do not adhere well to rubber materials even when impregnated with RFL. The deficiency of polyesters in this respect is considered due to the extremely low functionality of the molecular structure of polyester synthetic fibers, i.e. sparsity of reactive functional groups.

In general, however, polyester synthetic fibers have excellent tensile strength, shock resistance, elongation (stretch) resistance, dimensional stability, thermal resistance, water resistance, resistance to chemicals, weather resistance, etc., as compared with the other fiber materials mentioned above. Thus, polyester synthetic fibers possess physical properties most suitable for the reinforcement of rubber products. Accordingly, there exists a need in the art to improve the adhesion of polyester synthetic fibers to rubbers.

Various methods have been proposed in the prior art for improving the adhesion of polyester fibers to rubber, including: (1) treatment of the polyester fiber in one step (i.e. a single bath process) by the use of a modified RFL or a mixture of RFL and another adhesive or adhesives (which method has been developed by ICI Co., Ltd. using an adhesive which is marketed under the tradename PEXUL), (2) treatment of the polyester fiber in two steps (i.e. a two bath process) wherein the fiber is pre-treated at a spinning or dipping stage so as to facilitate the bonding of RFL with the fiber, and is then treated with RFL, and (3) a method for directly adhering the fiber to a rubber material by the use of an isocyanate containing rubber solution. Of the above, methods (1) and (2) are used commercially. However, method (1) fails to give a satisfactorily high adhesion, and method (2) suffers from the disadvantage that the blocked isocyanate, ethyleneurea, phenylurethane or epoxy resin which is employed at the pre-treating stage in the form of an organic solvent solution, an emulsion or an aqueous dispersion, have poor stability in such solutions and the adhesion between the fibers thus treated and rubber materials is unsatisfactory, and the production costs are disadvantageously high.

SUMMARY OF THE INVENTION

It has now been discovered that, by immersing polyester fibers in a liquid bath containing a reaction product of resorcinol, an allyl halide, and an alkali metal hydroxide, and then immersing in a conventional RFL bath, RFL-coated fibers which show an extremely high degree of adhesion to rubber materials can be obtained. Applying these solutions by immersion or other conventional means results in coated or inpregnated fibers.

The present invention is a two stage treatment process. In the first stage a solution containing a reaction product of resorcinol, an allyl halide, and an alkali metal hydroxide is applied to a polyester fiber. The polyester fiber is further treated in the second stage by applying a conventional latex condensate of resorcinol and formaldehyde. Applying these solutions by immersion or other conventional means results in a coated or impregnated fiber. To form the impregnating material of the first stage treatment, resorcinol, an allyl halide and an alkali metal hydroxide are reacted together in the following proportions: about 0.1 to about 1.0 mole of the alkali metal hydroxide per one mole of resorcinol and about 0.1 to about 1.0 mole of the allyl halide per one mole of the resorcinol. The reaction product used in the first stage treatment contains allyl-(3-hydroxphenyl)-ether and derivatives and polymers thereof as its major component. Formaldehyde and ammonia are sequentially added to the reaction product to form the treatment solution of the first stage.

It is therefore an object of the present invention to provide a method for treating polyester synthetic fibers to render them more suitable for use as a rubber reinforcement which method overcomes the prior art disadvantages described above.

It is another object of the present invention to provide a method for treating polyester synthetic fibers wherein the fibers are pre-treated with a low cost and highly stable solution and then treated with RFL to give fibers which will strongly adhere to a rubber material.

Other objects and features and advantages of the present invention will be apparent from the following description.

DESCRIPTION OF THE PREFERRED EMBODIMENTS

The reaction of resorcinol an allyl halide and an alkali metal hydroxide produces a solution which is used at the first stage of the present invention and which contains as its main component allyl-3(-hydroxyphenyl)-ether which is produced in accordance with the following reaction formula:

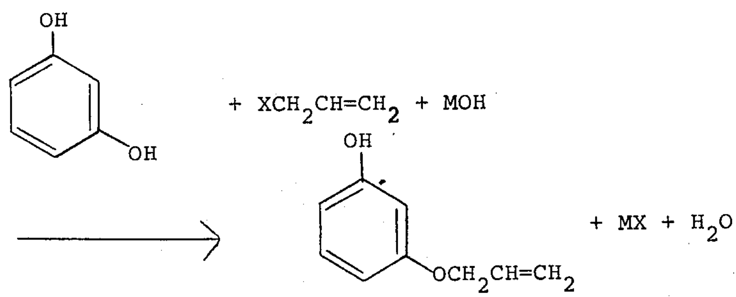

wherein X represents a halogen and M represents an alkali metal. Infra-red spectrum analyses reveal that ether bonds exist in the reaction product, and MX (i.e. KBr or NaBr) is produced by the reaction, so that the main reaction product is considered to be allyl-(3-hydroxyphenyl)-ether, and derivatives and polymers thereof.

The reaction product which is used as a treating liquid at the first step of the present invention is prepared by using an excess of resorcinol, i.e. 1 mol. of resorcinol is used per 0.1 to 1.0 mol., preferably 0.3 to 0.7 mols., each for the allyl halide and alkali metal hydroxide. The reaction product may be readily produced by thermally melting an excess of resorcinol and an alkali metal hydroxide, and then gradually adding an allyl halide dropwise to initiate the reaction. The resulting reaction product is dissolved in methanol and the secondarily produced alkali metal halide is removed by filtration. The product is finally recovered by distilling off the methanol. Alternately, the reaction may be conducted in the presence of an organic solvent such as methanol, ethanol, n-propanol, isopropanol, acetone, ether or tetrahydrofuran. The first bath used in the process of the present invention contains the resulting reaction mixture which, in turn, contains unreacted resorcinol, allyl-(3-hydroxyphenyl)-ether, its derivatives and polymers. Suitable allyl halides which may be used in preparing a mixture or solution for the first treatment bath include allyl bromide, allyl chloride, allyl iodide and allyl fluoride. Allyl bromide and allyl chloride are preferred. The preferred alkali metal hydroxides are sodium hydroxide and potassium hydroxide.

To adapt the above reaction mixture for use in the first stage of the process of the present invention, formalin is first added to the reaction product, and then aqueous ammonia is added to form an alkaline aqueous solution. Formalin may be added to the reaction product until the critical point where the product gells. Experiments show that the critical amount of formalin varies proportionally with the amount of resorcinol remaining in the reaction mixture.

The above-described treatment solution is applied to the polyester fiber in a conventional manner, i.e. the fiber is immersed into the treatment solution and dried at a temperature of 150°C to 250°C. This treating solution has excellent chemical and physical stability, so that it is possible to preserve the solution over a relatively long period of time. In addition, the treating solution is readily miscible with water and, therefore, it is not required to dilute the solution by use of a dispersing agent or an emulsifier, or to use a colloid mill.

The polyester synthetic fiber treated as described above is then impregnated with RFL in the second stage in a manner similar to that of the first stage.

When polyester fiber which has been subjected to the above-described two-stage treatment is closely contacted with an unvulcanized rubber containing suitable additives, an extremely high degree of adhesion between the fiber and the rubber can be attained by thermal vulcanization of the rubber as shown in the examples described below.

In general, a fibrous material such as a rayon or nylon can be strongly adhered to a rubber by immersing the material into a liquid mixture of resorcinol and an initial condensate of formalin and a rubber latex, i.e. RFL, heating the thus treated fibers, bringing the resultant material and an unvulcanized rubber into close contact, and finally subjecting the fiber-rubber composite to vulcanization. The various factors which affect the adhesion of the RFL-treated fiber to rubber, include the molar ratio of resorcinol to formalin in the RFL, the reaction conditions for the condensation reaction of resorcinol and formalin, the mixing weight ratio of the resorcinol-formalin condensate and latex, the type of latex used, the aging time of the RFL, the temperature of the RFL treatment, and the particular rubber composition to which the fiber is adhered. The strong adhesion to rubber of fibers such as nylon and rayon which is obtained by the one-step treatment with RFL is attributed to the fact that such fibers contain therein functional groups effective for such adhesion. On the other hand, polyester fibers have no such functional or polar groups. The polyester fibers useful for rubber reinforcement have a high degree of crystallinity and orientation, so that when treated with RFL alone, the resultant polyester fiber does not adhere to a rubber as strongly as the RFL-treated nylon or rayon. Accordingly, it is considered to be unexpected and unusual that a polyester fiber can be treated by the two-step treatment of the present invention, to give as strong an adhesion to a rubber as do nylons and rayons treated with RFL alone.

The present invention is further illustrated by the following examples:

EXAMPLE 1

1. Preparation of the reaction product of resorcinol, an allyl halide, and an alkali metal hydroxide:

Five different reaction solutions were prepared using the compositions shown in Table 1 below, wherein allyl bromide was used as the allyl halide, and potassium hydroxide as the alkali metal hydroxide.

Table 1

| Experiment No. | 1 | 2 | 3 | 4 | 5 |
|---|---|---|---|---|---|
| Component Resorcinol | 110.0 (1.0) | 110.0 (1.0) | 110.0 (1.0) | 110.0 (1.0) | 110.0 (1.0) |
| Allyl bromide | 12.1 (0.1) | 36.3 (0.3) | 60.5 (0.5) | 84.7 (0.7) | 108.9 (0.9) |
| Potassium Hydroxide | 5.6 (0.1) | 16.8 (0.3) | 28.0 (0.5) | 39.2 (0.7) | 50.4 (0.9) |

Note:
Values without parenthesis are shown by weight and values in parenthesis by mole.

Resorcinol and potassium hydroxide were melted in a flask at 120°C to which melt allyl bromide was slowly added dropwise with agitation. The resulting reaction product was dissolved in methanol and filtered to remove potassium bromide, a secondary product, therefrom. Then, the methanol was removed by distillation. The resulting products contained a mixture of resorcinol, allyl-(3-hydroxyphenyl)-ether, and derivatives and polymers of the ether, with yields of 110–145 g. The yield varied with the reaction composition. The content of allyl-(3-hydroxyphenyl)-ether in the product increased with an increase in amount of allyl bromide and potassium hydroxide reactants, i.e. as the composition was varied from 1 to 5 as shown in Table 1. Although allyl bromide and potassium hydroxide were used in the above experiments, similar results could be obtained by using, for example, allyl chloride as the allyl halide and sodium hydroxide as the alkali metal hydroxide.

2. Preparation of the bath solution for use in the first impregnastage:

110 g of each of the five different reaction mixtures obtained above (Experiment Nos. 1 through 5) were placed in five separate flasks and thermally dissolved at 100°–120°C. Then, formalin was added slowly dropwise to each of the flasks, with agitation, in the amounts shown in Table 2. In no case did the addition of formalin cause the solution to gell. Aqueous ammonia was then added to each flask in the amounts indicated in Table 2, to obtain five different treating solutions.

Table 2

| Experiment No. of Reaction Product | 1 | 2 | 3 | 4 | 5 |
|---|---|---|---|---|---|
| Formalin (37%), g | 43 | 34 | 24 | 14 | 5 |
| Aqueous ammonia (28%), g | 30 | 30 | 30 | 30 | 30 |
| Water, g | 440 | 440 | 440 | 440 | 440 |
| Test No. | 10 | 11 | 12 | 13 | 14 |

The thus obtained treating solutions were dark brown in color with a solids content of 20–24% (determined by JIS K 6387) and a pH value of 9.3–9.7. For actual application, these solutions were diluted with water to give solutions containing 1–5 percent solids by weight.

3. Impregnation treatment of polyester synthetic fiber:

The five treating solutions prepared in the manner described above were each divided into three portions, and each portion was diluted to a solids concentration of 1, 3 and 5 percent by weight, respectively (to give a total of 15 test solutions). Polyester fiber "Tetron Tire Cord 1000 D/3" produced by Teijin K.K. was immersed in each of the diluted treating solutions, preliminarily dried at 120°C for 4 min. and then thermally treated at 230°C for 2 min. Thereafter, the fibers treated with the different first stage solutions were respectively immersed in second stage treating solutions (RFL). Each second stage solution had a composition approximating that shown in Table 3 below. The twice treated fibers were then preliminarily dried at 120°C for 4 min. and subjected to further heating at 230°C for 2 min.

Table 3

| | |
|---|---|
| Water | 472.15 (g) |
| Sodium hydroxide (10% aqueous solution) | 11.22 |
| Aqueous ammonia (28%) | 30.90 |
| Initial condensate of resorcinol-formalin (45%) (Adher-RF produced by Hodogaya Kagaku K.K.) | 62.33 |
| Styrene-butadiene latex (40%) (Nipol LX 110 produced by Nihon Zeon K.K.) | 219.17 |
| Vinyl Pyridine terpolymer latex (Hycar 2518 FS produced by Nihon Zeon K.K.) | 175.39 |
| Formalin (37%) | 28.90 |

Adhesion to Rubber Test:

The five different two-stage-treated tire cords thus obtained were separately embedded in an 8 mm length of unvulcanized rubber samples having the composition shown in Table 4. These fiber-rubber composites were then thermally treated at 148°C for 30 min. for vulcanization. The vulcanized test samples were subjected to the adhesion test.

Table 4

| | | |
|---|---|---|
| RRS No. 3 | 100.0 | parts by weight |
| Zinc oxide | 5.0 | parts by weight |
| Stearic acid | 2.0 | parts by weight |
| GPE carbon black | 30.0 | parts by weight |
| Antioxidant D | 1.0 | part by weight |
| Aromatic oil | 7.0 | parts by weight |
| Sulfur | 2.25 | parts by weight |
| Accelerator DM | 1.0 | part by weight |

For comparison, two similar tire cords were treated, the first (Test No. 15) being subjected to a one-step-treatment using RFL alone, and the second (Test No. 16) which was treated at the first stage with an epoxy treating solution having the composition shown in Table 5 (instead of the resorcin-allyl halide-alkali metal hydroxide bath), and at the second stage with RFL. Both controls were subject to the adhesion test together with the test samples 10 through 14.

The adhesion between the rubber and fiber was tested according to the H-test. This test was named after the H-form of the specimen and first employed by Goodyear Tire % Rubber, U.S.A. The test involves burying (or inserting) a fiber into a rubber piece and pulling the fiber in a direction coextensive with its length to measure the shear strength between the rubber and fiber surfaces. The specimen is prepared by aligning several rubber pieces at intervals, aligning several fibers thereon at regular intervals in the right direction to the pieces and curing the whole in a mold to bury (or insert) the fibers into the rubber and thus obtain a lattice-shaped sample where the rubber pieces and the fibers are arranged vertically and horizontally. The sample is cut into specimens, each specimen composed of two rubber pieces connected by a single fiber between them. The test is conducted by fixing one of the two rubber pieces and pulling the interconnecting fiber in the direction of its extension. The test is further described in Kagaku Dai-Jiten (Encyclopedia Chimica) at p. 936.

Table 5

| | |
|---|---|
| Neocol SW (Produced by Daiichi Kogyo K.K.) | 0.4 cc |
| Hylene MP (Produced by DuPont) | 16.0 g |
| Diemthylaminoethylmethacrylate (0.5% aqueous solution) | 25.0 cc |
| Epon 812 | 4.8 cc |

The above epoxy treating solution composition is disclosed in "Rubber Chemistry and Technology" by T. Takayama and J. Matsui 42 (1) 159 (1969).

The test results are shown in Table 6.

Table 6

| Concentration of First Stage treating solution | Test No. 10 | 11 | 12 | 13 | 14 | 15 | 16 |
|---|---|---|---|---|---|---|---|
| 1% | 18.0 | 21.0 | 20.9 | 19.2 | 18.8 | 13.5 | 17.8 |
| 3% | 17.8 | 20.0 | 20.9 | 20.7 | 19.2 | 13.5 | 17.8 |
| 5% | 18.0 | 19.6 | 20.8 | 20.1 | 19.1 | 14.9 | 17.8 |

Note:
Values described in Table 6 show strengths expressed by kg and obtained by H-test.

It is apparent from Table 6 that the polyester synthetic fiber which is treated in accordance with the method of the present invention (Test Samples Nos. 10–14) has superior adhesion to rubber materials as compared with that treated with RFL alone (Test No. 15) and that treated in the first stage with the epoxy solution and in the second stage with RFL (Test No. 16).

EXAMPLE 2

This experiment was conducted to examine the influences on adhesion which may occur due to variations in the amount of formalin which is used for preparing the treating solution employed in the first stage of the present invention.

Formalin was added in different amounts as shown in Table 7, to 110 g samples of the reaction product of resorcinol, allyl bromide, potassium hydroxide which was prepared in accordance with the component ratio of Experiment No. 2 given in Table 1 of Example 1 to prepare treating solutions for use in a first stage bath. The procedure of Example 1 was then repeated for treating polyester tire cords with each of the three solutions of Table 7.

Table 7

| | 2-1 | 2-2 | 2-3 |
|---|---|---|---|
| Formalin (37%), g | 10 | 22 | 34 |
| Ammonia (28%), g | 30 | 30 | 30 |
| Water, g | 440 | 440 | 440 |

The treating solutions 2–1, 2—2, and 2–3 of the first stage which were prepared in a manner mentioned above were diluted to a solids concentration of 3 percent by weight prior to use.

The resultant tire cords were embedded in test pieces of an unvulcanized natural rubber mixture, and then the test pieces were subjected to heat treatment for vulcanization. Adhesion between the tire cords and the test pieces was tested in accordance with the H-test, in a manner similar to that of Example 1. The test results are shown in Table 8 below.

Table 8

| | 2-1 | 2-2 | 2-3 |
|---|---|---|---|
| Adhesion by H-test, kg | 15.9 | 18.3 | 20.0 |

As is clear from Table 8, better adhesion can be obtained when a greater amount of formalin is used in the preparation of the first stage treating solution of the present invention. However, the formaldehyde should not be added in such a great amount as to invite gel formation.

EXAMPLE 3

This experiment was conducted to test the stability of the treating solution used in the first stage of the present invention.

A first stage treating solution of the type used in Test No. 11 of Example 1 (containing 3 percent by weight solids) was stored over 4 months at room temperature. After 4 months, the procedure of Example 1 was repeated using the stored solution to treat tire cords of polyester fibers according to the two-step or two-stage treatment.

After the treating solution had been stored for 4 months, the solution had not separated into layers nor had any precipitate formed.

Polyester cords which were treated in the first stage bath in a manner similar to Example 1 using the treating solution Test No. 11, (1) immediately after preparation, (2) after 1 month's, (3) 2 months', and (4) 3 months' storage, respectively, were separately embedded into test pieces of an unvulcanized natural rubber composition. Then the resultant test pieces were vulcanized and were respectively subjected to the H-test to determine their adhesion strengths. The test results are shown in Table 9.

Table 9

| Storing period of treating solution used at the first stage (Day) | 0 | 30 | 60 | 120 |
|---|---|---|---|---|
| Adhesion by H-test (kg) | 20.7 | 20.9 | 20.3 | 20.5 |

It will be understood from Table 9 that the storage of the treating solution produces no adverse affects, thus the treating solution used at the first stage of the present invention has excellent stability.

EXAMPLE 4

1. Preparation of a reaction product of resorcinol, an allyl halide, and an alkali metal hydroxide in the presence of methanol:

The reaction product was prepared using allyl bromide as the allyl halide and potassium hydroxide as the alkali metal hydroxide, and by using composition 2 shown in Table 1 of Example 1.

In the amounts shown as composition 2 of Table 1, resorcinol and potassium hydroxide were introduced into a flask and dissolved in 0.2 l of methanol. The resultant solution was heated with agitation at 70°C for about 1 hour. Then allyl bromide was slowly added dropwise into the solution with agitation. After completion of the addition of allyl bromide, the solution was continuously heated for an additional 10 hours while agitating. Thereafter, the secondarily produced potassium bromide was removed from the solution by filtration and then methanol was removed by distillation to obtain the desired reaction product.

2. Preparation of a treating solution for use in the first stage:

The treating solution was prepared from the above in the same manner as in Example 1 using composition 2 shown in Table 2 of Example 1.

A tire cord of a polyester synthetic fiber was treated using the above treating solution and a second stage treatment in the same manner as in Example 1. The thus treated tire cord was then embedded in test pieces made of an unvulcanized natural rubber composition, and subsequently vulcanized. The adhesion of the tire cord to the rubber was determined by the H-test to be 20.7 kg.

The above shows that when the reaction product which is obtained from a reaction in the presence of methanol and used for the first stage treating solution, the adhesion between the treated tire cord and a rubber is equivalent to that obtained using the treating solution of Example 1.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A process for treating a polyester fiber for use as rubber reinforcement comprising the steps of applying to said polyester fiber a solution comprising the reaction product which is obtained by reacting an excess of resorcinol with an allyl halide and an alkali metal hydroxide, drying said polyester fiber and further applying to said polyester fiber resorcinol-formalin resin latex.

2. The process of claim 1 wherein said reaction product is obtained by heating a mixture of resorcinol and an alkali metal hydroxide in a molar ratio of 1 mole resorcinol to 0.1 to 0.9 mole of said alkali metal hydroxide, and adding an allyl halide in a molar ratio of 0.1 to 0.9 mole per mole of resorcinol.

3. The process of claim 2 wherein said reaction is conducted in the presence of an organic solvent.

4. The process of claim 3 wherein said organic solvent is selected from the group consisting of methanol, ethanol, n-propanol, isopropanol, acetone, ether and tetrahydrofuran.

5. The process of claim 1 wherein said reaction product contains as its major component allyl-(3-hydroxyphenyl)-ether.

6. The process of claim 1 further comprising drying the fiber at a temperature of 150° to 250°C.

7. The process of claim 1 wherein formalin is added to said solution in an amount which is proportional to the excess of resorcinol and which will not cause gelation of the product.

8. The process of claim 7 wherein formalin is added at a temperature of from 100° to 120°C.

* * * * *